(12) United States Patent
Kato

(10) Patent No.: US 8,156,511 B2
(45) Date of Patent: Apr. 10, 2012

(54) DISC APPARATUS

(75) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 490 days.

(21) Appl. No.: 12/412,767

(22) Filed: Mar. 27, 2009

(65) Prior Publication Data

US 2009/0313647 A1    Dec. 17, 2009

(30) Foreign Application Priority Data

Jun. 17, 2008   (JP) ................................. 2008-158172

(51) Int. Cl.
*G11B 17/04*    (2006.01)
(52) U.S. Cl. .......................... 720/619; 720/620; 720/624
(58) Field of Classification Search .................. 720/619, 720/624, 620
See application file for complete search history.

(56) References Cited

U.S. PATENT DOCUMENTS

2002/0163870 A1*  11/2002  Ariyoshi et al. ............. 369/75.2
2004/0221301 A1   11/2004  Azai

FOREIGN PATENT DOCUMENTS

| JP | 11/086399   | 3/1999  |
| JP | 2003-100067 | 4/2003  |
| JP | 2004-348907 | 12/2004 |

* cited by examiner

*Primary Examiner* — Jami M Valentine
(74) *Attorney, Agent, or Firm* — Brinks Hofer Gilson & Lione

(57) ABSTRACT

A shutter member is provided so as to be capable of moving in association with a roller bracket. The shutter member rotates by a predetermined range in association with the rotation of the roller bracket, and then a projection of the shutter member is pressed in a Y1 direction by a shutter pressing portion provided on the right side slider. Accordingly, the shutter member is rotated clockwise, and an opening and closing panel portion of the shutter member closes an insertion port from the inside thereof. Therefore, the insertion port is closed reliably by the shutter member, so that insertion of another disc from the insertion port into the interior of the apparatus while the disc is rotating is prevented.

12 Claims, 4 Drawing Sheets

DISC APPARATUS

RELATED APPLICATIONS

The present application claims priority to Japanese Patent Application Number 2008-158172, filed Jun. 17, 2008, the entirety of which is hereby incorporated by reference.

BACKGROUND OF THE INVENTION

1. Field of the Invention

The present invention relates to a disc apparatus having an opening and closing member which closes an insertion port when a disc is inserted from the insertion port and is loaded in the apparatus.

2. Description of the Related Art

The disc apparatus of so-called a slot-in system is provided with an insertion port opening on a housing in a slit-shape, and a disc inserted into the insertion port is transported into the interior of the housing by a conveying roller and is loaded therein. As a disc apparatus of this type, there is the one which is provided with a shutter member as an opening and closing member for opening and closing the insertion port. When the disc is clamped in the housing, the insertion port is closed by the shutter member, so that erroneous insertion of another disc from the insertion port into the interior of the housing is prevented.

In this disc apparatus, it is necessary to move the shutter member so as to keep the insertion port in an opened state when waiting for the insertion of the disc, and close the insertion port after the disc is transported.

In general, a specific opening and closing mechanism for moving the shutter member is provided in the interior of the housing as described in Japanese Unexamined Patent Application Publication No. 2003-100067 and Japanese Unexamined Patent Application Publication No. 2004-348907. However, this opening and closing mechanism is complicated in structure and requires many components to constitute the mechanism because it is necessary to move the shutter member and close the insertion port at the same timing when the loading of the disc is completed. It also has disadvantages such that assembly is complicated, and the opening and closing mechanism occupies a large space in the housing.

A disc apparatus disclosed in Japanese Patent No. 3634126, a roller arm for supporting the conveying roller for conveying the disc is provided between a turn table that rotates the disc and the insertion port. The roller arm is mounted so as to rotate about a shaft positioned on the side of the insertion port with respect to a supporting portion of the conveying roller as a pivot. The roller arm is provided with a door on the side of the insertion port with respect to the pivot.

This disc apparatus is configured in such a manner that when the roller arm rotates in the direction in which the conveying roller comes into press-contact with the disc, the door is moved away from the insertion port so that the insertion port is opened and, in contrast, when the roller arm is rotated in the direction in which the conveying roller is moved away from the disc, the insertion port is closed by the door.

However, since this disc apparatus has a structure in which the conveying roller and the door are provided at both end portions of the horizontally extending roller arm, and the roller arm rotates about the midsection thereof as a pivot, the distance of movement of the conveying roller and the distance of opening and closing movement of the door cannot be set individually. Therefore, problems such that the conveying roller fails to move to a position sufficiently apart from the disc or, in contrast, if an attempt is made to move the conveying roller sufficiently apart from the disc when the insertion port is closed by the door, the distance of movement of the door becomes too long, so that the adequate opening and closing operation is impaired might occur.

SUMMARY OF THE INVENTION

Accordingly, it is an object of the present embodiments to provide a disc apparatus in which an opening and closing member for opening and closing an insertion port is supported by a supporting member configured to support a conveying member so as to allow the opening and closing member to move in association with an action of the supporting member, whereby a supporting structure of the opening and closing member is simplified.

It is another object of the present embodiments to provide a disc apparatus in which the distances of movements of the supporting member and the opening and closing member can be set individually, the conveying member can be moved from a conveyed position to a retracted position by a sufficient distance by the action of the supporting member and, in addition, the opening and closing member can be moved by a distance adequate for opening and closing the insertion port.

According to a first aspect of the present embodiments, there is provided a disc apparatus including a housing having an insertion port from which a disc is inserted and a conveying member provided inside the insertion port for conveying the disc including: a supporting member configured to support the conveying member and move the conveying member to a disc conveying position and a retracted position apart from the disk; an opening and closing member movably supported by the supporting member; and a change-over member configured to provide a moving force to the opening and closing member, in which when the supporting member moves the conveying member from the disk conveying position to the retracted position, the opening and closing member is moved to a position near the insertion port or a position to close part of the insertion port in association with the movement of the supporting member, and then, the opening and closing member is moved by the change-over member to a position to close the insertion port.

According to the disc apparatus in the present embodiments, the structure to support the opening and closing member is simple since the opening and closing member which opens and closes the insertion port is supported by the supporting member. Also, since the opening and closing member is moved toward the insertion port at the same timing when the supporting member is activated and the conveying member is moved away from the disc, the synchronous action of the opening and closing member with the movement of the conveying member is achieved by a mechanism having a least number of components. Also, since the opening and closing member is moved by the change-over member to close the insertion port after the opening and closing member is near the insertion port or closes part of the insertion port, the distance of the movement of the conveying member and the distance of the opening and closing movement of the opening and closing member may be set to optimal distances independently from each other.

Preferably, the supporting member is rotatably supported in the housing, the rotational pivot of the supporting member is provided on the side of the insertion port with respect to the conveying member, and the opening and closing member is movably supported by the supporting member on the side of the insertion port with respect to the conveying member. Preferably, the opening and closing member is rotatably supported by the supporting member by a connecting pivot, and the connecting pivot is at a position different from the rotational pivot of the supporting member.

Preferably, when the supporting member is rotated and the conveying member is moved away from the disc, the opening and closing member is allowed to rotate together with the supporting member and move to a position near the insertion port or a position to close part of the insertion port. At this time, the amount of movement of the conveying member can be set to a large amount and the amount of movement of the opening and closing member to an optimal distance required for opening and closing action by setting the distance from the rotational pivot to the conveying member and the distance between the connecting pivot and the rotational pivot appropriately.

In the present embodiments, the supporting member may be moved linearly in the housing instead of rotating, or the opening and closing member may be supported so as to be capable of moving linearly without rotating with respect to the supporting member.

Preferably, the opening and closing member is formed of a panel member and includes a curved portion projecting outwardly of the insertion port.

When a configuration in which the peripheral edge portion of the disc loaded in the housing opposes the inner surface of a curved portion of the opening and closing member is employed, the distance between the peripheral edge portion of the disc and the opening and closing member is secured, and the outer peripheral edge of the disc is prevented from coming into abutment with the opening and closing member even when the insertion port is arranged near the outer peripheral edge of the loaded disk.

Preferably, the curved portion enters the interior of the insertion port when the opening and closing member closes the insertion port.

In this configuration, the position to load the disk may be set to a position near the insertion port, so that a compact disk apparatus is achieved.

Preferably, the opening and closing member includes a bent strip formed by bending the edge portion of the curved portion toward the opposite side from the side where the connecting pivot exists, and the bent strip opposes the inside of the edge portion of the insertion port when the opening and closing member closes the insertion port.

In this configuration, a clearance is not formed between the curved portion of the opening and closing member and the edge portion of the insertion port when the opening and closing member closes the insertion port, so that entry of the disc into a clearance is prevented.

Preferably, the inner surface of the opening member extends from the insertion port inwardly of the housing and serves as a guide surface for the disc inserted from the insertion port when the opening and closing member is in an opened position apart from the insertion port.

In this configuration, by using the opening and closing member in the state of opening the insertion port as the guide surface of the disk, the disk is corrected to a normally inserted position by the guide surface even when the disc is inserted obliquely with respect to the insertion port.

Preferably, the change-over member moves the supporting member by a moving force in one direction to move the conveying member from the disk conveying position to the retracted position, and then moves further in the one direction to move the opening and closing member to the position to close the insertion port.

In this configuration, by moving the opening and closing member to the closed position by the moving force of the change-over member which moves the supporting member, a change-over member specific for causing the opening and closing member to act is not necessary, so that the number of components is reduced, and the opening and closing member is allowed to act at the same timing with the movement of the conveying member.

Also, since the opening and closing member is moved to a position near the insertion port or a position to close part of the insertion port by the moving force of the supporting member and then is moved to a closing position by the change-over member, sufficient movement of the opening and closing member to the closed position is achieved even when the distance of movement of the change-over member after the supporting member is moved to the retracted position is short.

Preferably, the moving force of the change-over member is transmitted to the opening and closing member via a resilient member. Preferably, the resilient member is a resiliently deformable portion formed integrally with the change-over member.

In this configuration, by applying the moving force of the change-over member to the opening and closing member via the resilient member, if a finger or the like is inserted into the insertion port when the opening and closing member is about to close the insertion port, the application of a large pressing force to the finger or the like by the moving force of the change-over member is prevented.

According to the disc apparatus in the present embodiments, the structure to support the opening and closing member is simple since the supporting member which moves the conveying member is caused to support the opening and closing member.

Also, since the opening and closing member is moved to the closing position by the change-over member after the opening and closing member is moved to the position near the insertion port or the position to close part of the insertion port by the supporting member which supports the conveying member, the distance of movement of the conveying member and the amount of movement in the opening and closing action of the opening and closing member may be set individually to optimal values.

DESCRIPTION OF THE PREFERRED EMBODIMENTS

Figure 1:
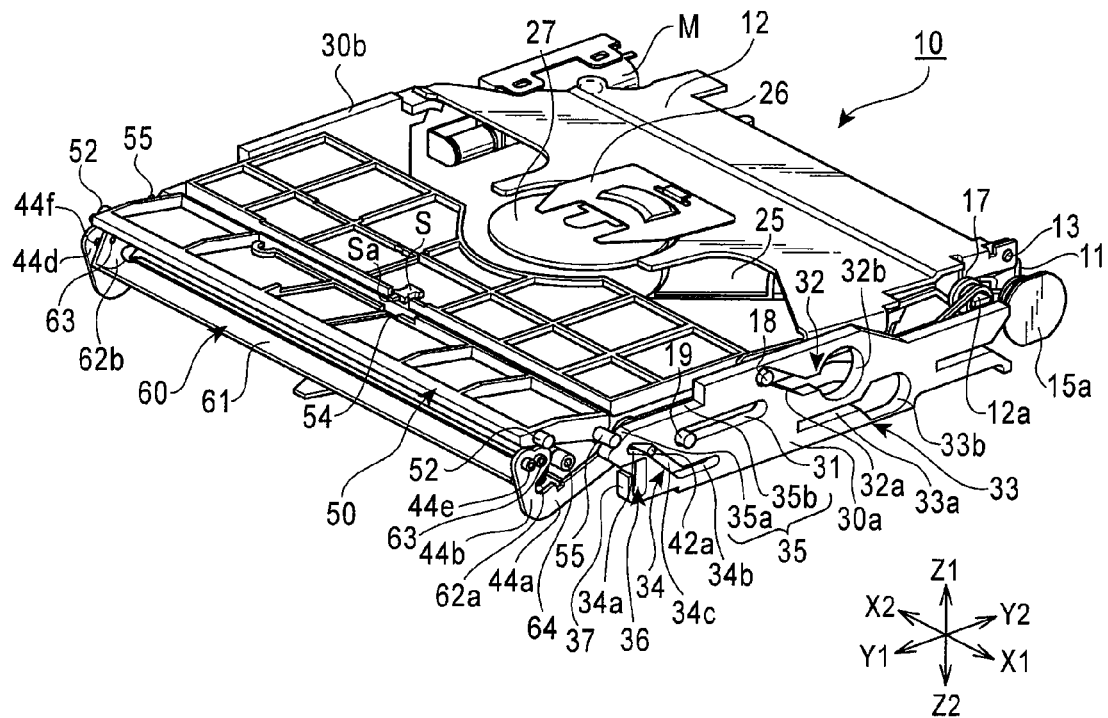
FIG. 1 is a perspective view showing an entire structure of a disc apparatus according to an exemplary embodiment.
Figure 2:
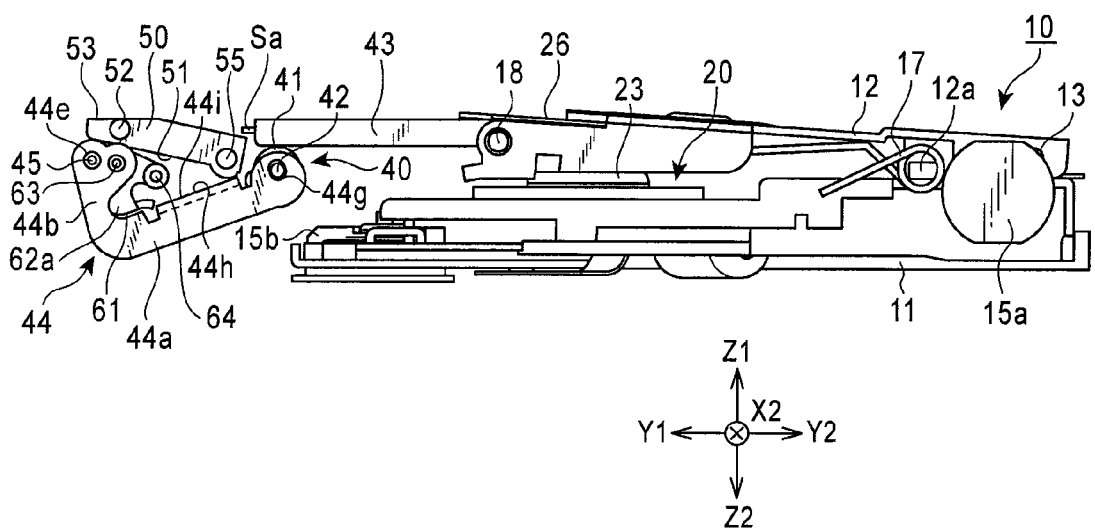
FIG. 2 is a right side view of FIG. 1.

FIG. 1 is a perspective view showing an entire structure of a disc apparatus according to an exemplary embodiment, and FIG. 2 is a right side view of FIG. 1. FIGS. 1 and 2 show a state of waiting for insertion of a disc with a housing omitted.

Figure 3:
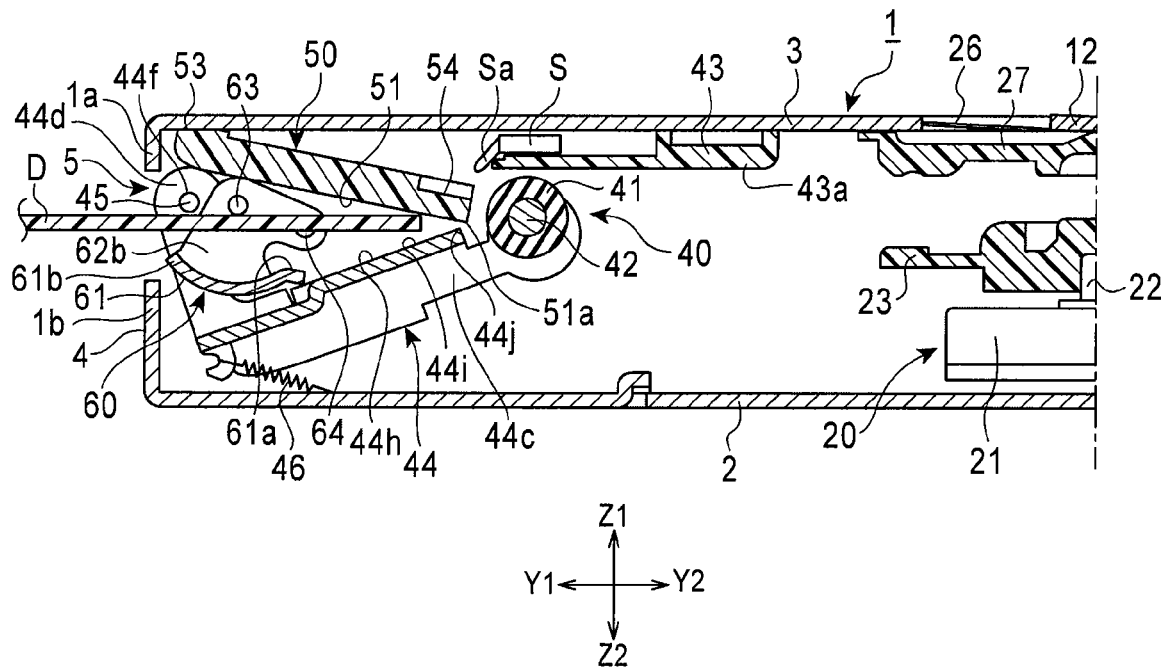
FIG. 3 is a partial enlarged cross-sectional view showing a state in which a disc is inserted from an insertion port.
Figure 4:
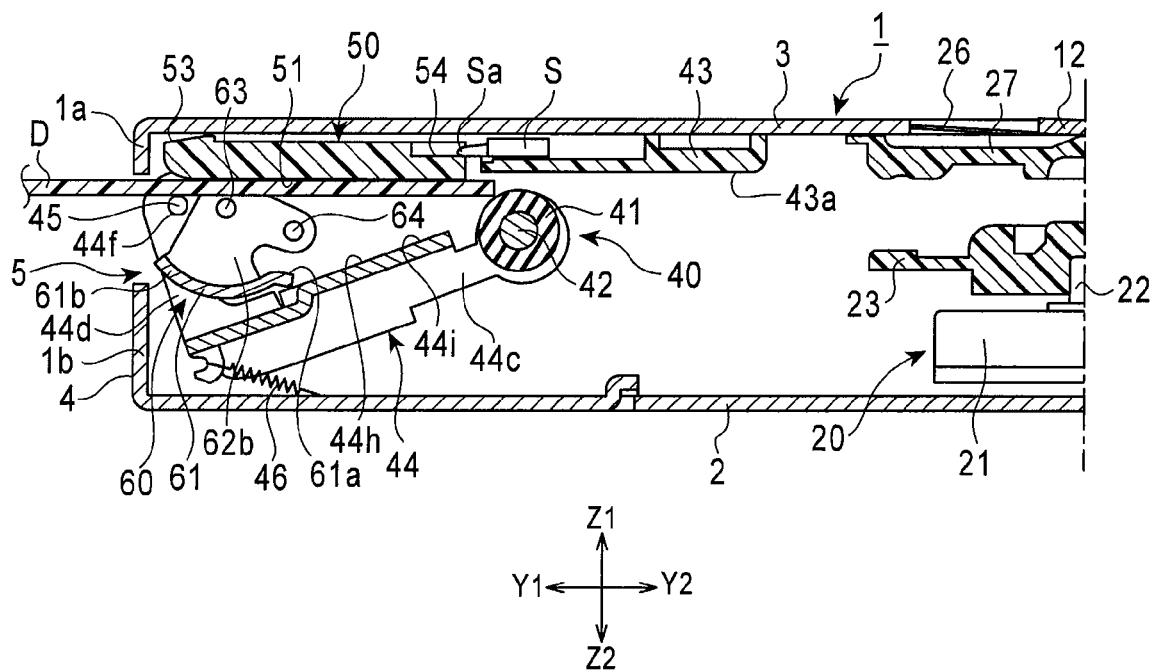
FIG. 4 is a partial enlarged cross-sectional view showing a state in which the disc is inserted to a conveying mechanism.
Figure 5:
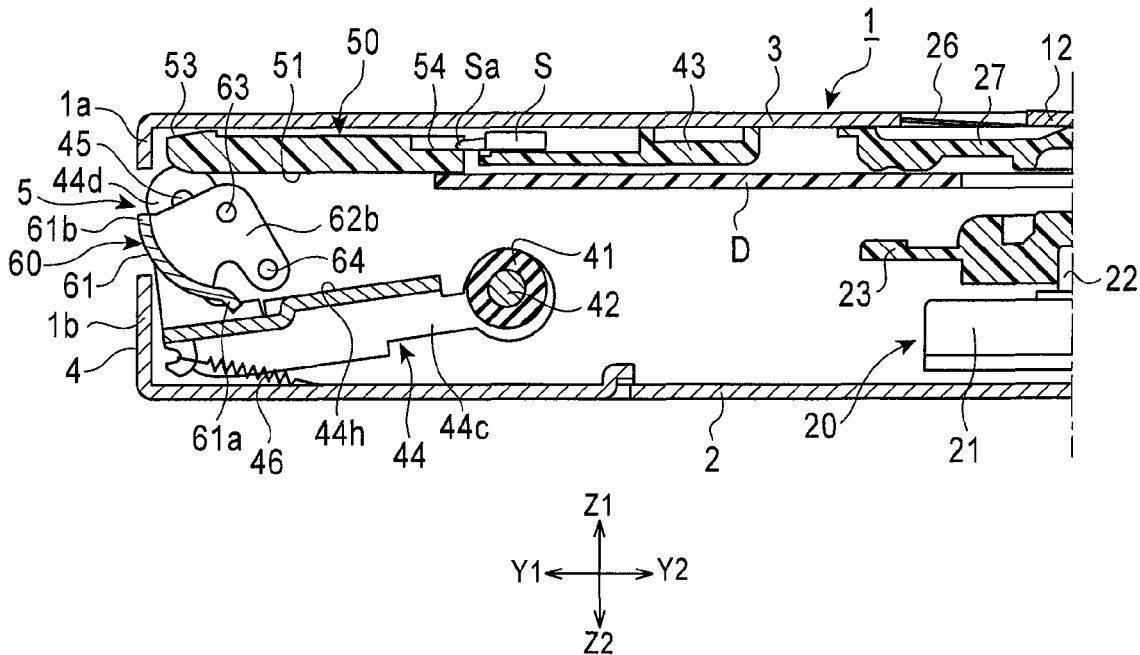
FIG. 5 is a partial enlarged cross-sectional view showing the state in which the disc is conveyed to a clampable position.
Figure 6:
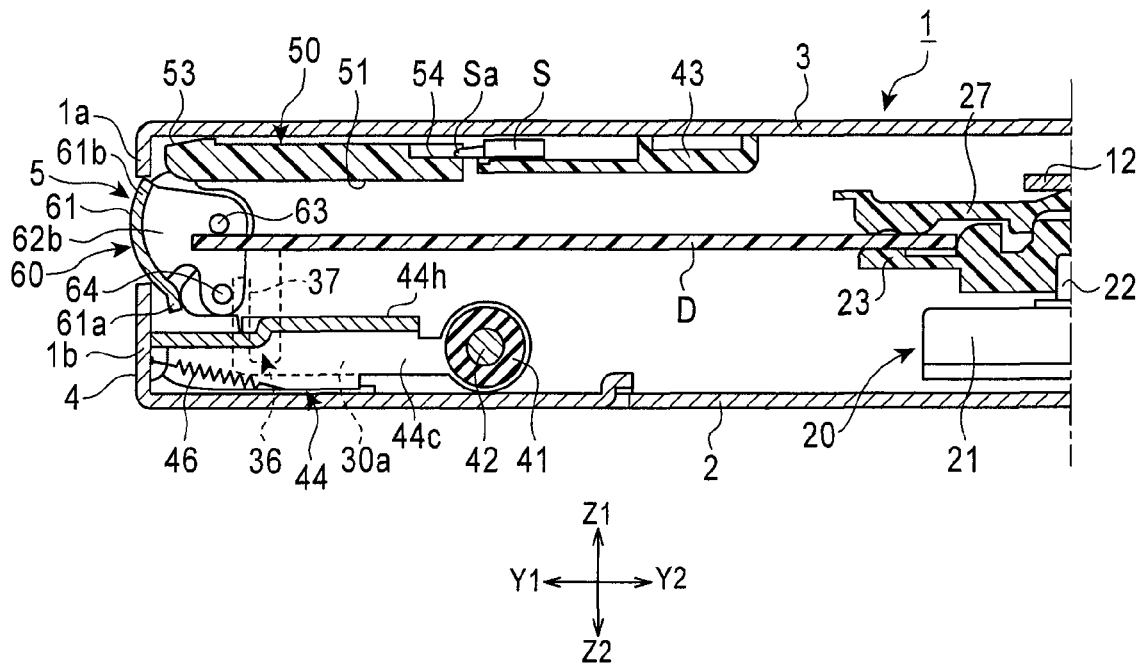
FIG. 6 is a partial enlarged cross-sectional view showing the state in which the disc is inserted to the clampable position.
Figure 7:
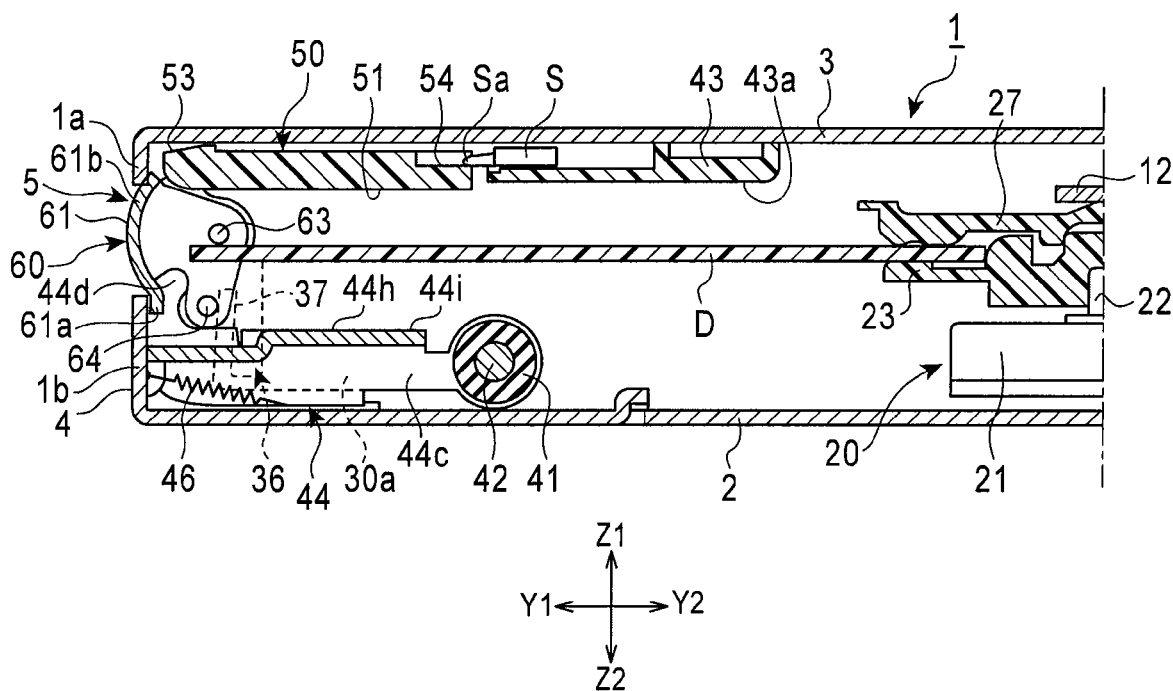
FIG. 7 is a partial enlarged cross-sectional view showing a state in which the disc is conveyed in the interior of a housing and is completely clamped and a shutter member is closed.

FIGS. 3 to 7 are partial enlarged cross-sectional views showing an action from when the disc is inserted until when a shutter member is closed, in which FIG. 3 shows a state in which the disc is inserted from an insertion port, FIG. 4 shows a state in which the disc is inserted to a conveying mechanism, FIGS. 5 and 6 show states in which the disc is conveyed to a clampable position, and FIG. 7 shows a state in which the disc is conveyed into the interior of the housing and completely clamped, and the shutter member is closed, respectively.

Throughout the drawings, X1, X2, Y1, Y2, Z1, and Z2 correspond to the right, left, front, rear, up, and down, respectively. In FIG. 2, a right side slider 30a is not shown. In FIGS. 3 to 7, part of a housing 1 having the insertion port is shown in cross-section, but the housing 1 is not shown in FIGS. 1 and 2.

The disc apparatus allows loading of discs D having a diameter of 12 cm such as DVDs (Digital Versatile Disk) or CDs (Compact Disk).

As shown in FIGS. 3 to 7, the disc apparatus includes the housing 1. The housing 1 is formed of a metallic panel. In the case of the disc apparatus for mounting on a vehicle, the size of the housing 1 is, for example, 1 DIN size or ½ DIN size, and the housing 1 is installed by being embedded in an instrument panel in a cabin of a vehicle.

The housing 1 includes a bottom panel 2, a ceiling panel 3, and a front panel 4. The housing 1 includes a rear panel on the Y2 side, and side panels on the X1 side and X2 side. The front panel 4 of the housing 1 is formed with an insertion port 5. Attached in front of the front panel 4 of the housing 1 is a decorative panel formed of synthetic resin, and various operating members or a display device are provided on the front surface of the decorative panel. The decorative panel is formed with a panel insertion port which communicates with the insertion port 5, and the disc D is inserted toward the interior of the housing 1 via the panel insertion port and the insertion port 5. The insertion port 5 is formed so as to be elongated in the crosswise direction (X1-X2 direction).

A mechanism unit 10 shown in FIGS. 1 and 2 is stored in the interior of the housing 1. As shown in FIG. 2, the mechanism unit 10 includes a drive base 11 on the bottom side, and a cramp base 12 on the upper side. The drive base 11 and the cramp base 12 are both formed by bending metallic panels. As shown in FIGS. 1 and 2, the drive base 11 includes a connecting shaft 13 extending in the X1 direction and X2 direction on the Y2 side, and an end portion of the cramp base 12 on the Y2 side is rotatably supported by the connecting shaft 13.

Provided in the interior of the housing 1 are a plurality of dampers 15a and 15b which resiliently support the drive base 11. As shown in FIGS. 1 and 2, the dampers 15a and 15b are configured by encapsulating oil in the interiors of resilient bags. The dampers 15a and 15b are fixed to the inner surface of the housing 1, and a supporting shaft fixed to the drive base 11 is supported by the respective dampers 15a and 15b. After the disc D is loaded to the mechanism unit 10, the disc D is rotated in a state in which the drive base 11 is resiliently supported by the dampers 15a and 15b.

As shown in FIG. 2, the drive base 11 is provided with a rotary driver 20 on the Y1 side. As shown in FIG. 3, the rotary driver 20 includes a spindle motor 21 fixed above the drive base 11, and a turn table 23 formed of synthetic resin and fixed to a revolving shaft 22 of the spindle motor 21.

As shown in FIG. 1, an optical head 25 is mounted on the drive base 11. The optical head 25 is movably supported by a guide mechanism provided on the drive base 11, and is provided with a thread mechanism that makes the optical head 25 reciprocate along the guide mechanism. The optical head 25 is moved by the thread mechanism radially of the disc D along a recording surface of the disc D clamped by the turn table 23.

As shown in FIG. 1, a damper 27 formed of synthetic resin is rotatably supported at an end portion of the cramp base 12 in the Y1 side, and a leaf spring 26 which presses the revolving shaft of the damper 27 downward (Z2 direction) is provided.

As shown in FIGS. 1 and 2, a projecting strip 12a projecting in the X1 direction is integrally formed at an end portion of the drive base 11 on the Y2 side, and a torsion coil spring 17 is attached to the projecting strip 12a. One of arms of the torsion coil spring 17 is pressed against the drive base 11, and the other arm is pressed against the cramp base 12, and hence the cramp base 12 is constantly urged counterclockwise with the connecting shaft 13 as a pivot. In other words, the cramp base 12 is rotationally urged constantly so that the damper 27 is pressed against the turn table 23 as shown in FIG. 7.

As shown in FIGS. 1 and 2, a lifting shaft 18 projecting in the X1 direction is fixed to an end portion of the cramp base 12 on the Y1 side. When an upward (Z1 direction) force is applied to the lifting shaft 18, the cramp base 12 is rotated clockwise against the urging force of the torsion coil spring 17, and the damper 27 is moved away from the turn table 23.

As shown in FIG. 1, the drive base 11 of the mechanism unit 10 is provided with the right side slider 30a which functions as a first change-over member on the X1 side, and a left side slider 30b which functions as a second change-over member on the X2 side. As shown in FIG. 1, the right side slider 30a is formed with an elongated guide hole 31 so as to extend in the fore-and-aft direction (Y1-Y2 direction), and a guide shaft 19 is fixed to the drive base 11. Although a plurality of sets of the elongated guide hole 31 and the guide shaft 19 are provided on the one piece of the right side slider 30a, only one set is shown in FIG. 1. The right side slider 30a is allowed to reciprocate in the Y1-Y2 direction by the sliding movement of the elongated guide hole 31 on the guide shaft 19. In the same manner, the left side slider 30b is also supported on the X2 side of the drive base 11 so as to be capable of reciprocating in the fore-and-aft direction.

A motor M is provided at the left rear of the drive base 11, and the left side slider 30b is driven in the fore-and-aft direction by the power of the motor M. A link mechanism is provided on the lower surface of the drive base 11, so that the left side slider 30b and the right side slider 30a are connected by the link mechanism and are moved synchronously in the same direction. In the waiting state shown in FIG. 1, the right side slider 30a and the left side slider 30b are both moved rearward (Y2 direction).

A load sensing mechanism that senses the fact that a center hole of the disc D of 12 cm in diameter reaches on the turn table 23 is provided on the drive base 11. When the load sensing mechanism senses the disc D, the motor M is activated, and the right side slider 30a and the left side slider 30b are moved together in the Y1 direction synchronously.

The right side slider 30a will be mainly described below. The right side slider 30a and the left side slider 30b demonstrate the same function, and the shape and the structure of the left side slider 30b is the same as those of the right side slider 30a.

As shown in FIG. 1, a clamp control cam portion 32 is provided on the right side slider 30a. The clamp control cam portion 32 includes an elongated cam hole 32a which is directed upward (Z1 direction) as it goes forward (Y1 direction), and a release hole portion 32b having a large diameter continuing to the elongated cam hole 32a on the Y2 side. The lifting shaft 18 provided on the cramp base 12 is inserted therein so as to move inside the elongated cam hole 32a and the release hole portion 32b.

In the waiting state shown in FIG. 1, since the right side slider 30a is moved rearward (Y2 direction), the lifting shaft 18 is lifted in the Z1 direction by the elongated cam hole 32a. At this time, as shown in FIGS. 3 and 4, the cramp base 12 is rotated clockwise and the damper 27 is set to a clamp-released state being away from the turn table 23 upward. When the center hole of the disc D is moved onto the turn table 23 and the load sensing mechanism is activated, and the motor M is activated to move the right side slider 30a forward (Y1 direction), the lifting shaft 18 is moved into the release hole portion 32b. At this time, as shown in FIG. 7, the cramp base 12 is rotated counterclockwise by a resilient force of the torsion coil spring 17, the center portion of the disc D is pressed against the turn table 23 by the damper 27, and the disc D is clamped by the turn table 23.

As shown in FIG. 1, a lock cam portion 33 is provided on the right side slider 30a. The lock cam portion 33 includes an elongated lock hole 33a extending in the fore-and-aft direction, and a release hole portion 33b having a large diameter continuing to the Y2 side of the elongated lock hole 33a.

When the right side slider 30a is moved in the Y2 direction in the waiting state shown in FIG. 1, a constraining shaft (not shown) provided by being fixed to the housing 1 is held in the elongated lock hole 33a. At this time, the mechanism unit 10 is held inside the disk drive apparatus 1 in a stationary state, and the disc D conveyed from the insertion port 5 is allowed to move easily into a clearance between the turn table 23 and the damper 27 which is apart from the turn table 23. When the load sensing mechanism is activated and the right side slider 30a is moved in the Y1 direction, as shown in FIG. 7, the damper 27 is moved downward and the center portion of the disc D is clamped and, simultaneously, the elongated lock hole 33a is released from the constraining shaft, and the constraining shaft is moved into the release hole portion 33b. At this time, the mechanism unit 10 is not constrained in the housing 1, and is resiliently supported by the dampers 15a and 15b. While the disc DD clamped by the turn table 23 is rotated, external vibrations are absorbed as vibrations of the dampers 15a and 15b, so that the mechanism unit 10 is prevented from being directly affected thereby.

As shown in FIGS. 2 and 3, a conveying mechanism 40 is provided between the insertion port 5 and the rotary driver 20.

The conveying mechanism 40 includes a transporting roller 41, and a fixed guiding portion 43 opposing the conveying roller 41 on the Z1 side. The conveying roller 41 and the fixed guiding portion 43 are conveying members in the invention, respectively. In this embodiment, the conveying roller 41 as one of the conveying members is supported by the roller bracket 44 as a supporting member, and when the roller bracket 44 is rotated, the disc D is clamped between the conveying roller 41 and the fixed guiding portion 43. However, in contrast, the invention may be configured in such a manner that the conveying roller 41 is provided in a stationary state in the housing 1, and the fixed guiding portion 43 is supported by the roller bracket 44 so that the disc is clamped between the fixed guiding portion 43 and the conveying roller 41 when the roller bracket 44 is rotated. Alternatively, a roller which rotates freely may be used instead of the fixed guiding portion 43.

The fixed guiding portion 43 is formed of synthetic resin material having a small coefficient of friction, and is fixed to the lower surface of the ceiling panel 3 of the housing 1 in a stationary state. The lower surface of the fixed guiding portion 43 corresponds to a guide surface 43a extending horizontally in the Y1-Y2 direction.

The conveying roller 41 is formed of a material having a large coefficient of friction such as synthetic rubber into a cylindrical shape, and is mounted on the outer periphery of metallic roller shaft 42. Both end portions of the roller shaft 42 are supported by the roller bracket 44.

The roller bracket 44 is formed of a metallic panel. As shown in FIGS. 1 and 2, the roller bracket 44 includes a right side supporting portion 44a and a right side distal portion 44b which extends upward from a Y1 side distal portion of the right side supporting portion 44a on the X1 side. Also, as shown in FIG. 3, the roller bracket 44 includes a left side supporting portion 44c and a left side distal portion 44d which extends upward from a Y1 side distal portion of the left side supporting portion 44c on the X2 side.

As shown in FIG. 2, on the X1 side of the roller bracket 44, a supporting hole 44e is opened at the right side distal portion 44b and, as shown in FIG. 3, on the X2 side of the roller bracket 44, a supporting hole 44f is formed on the left side distal portion 44d. The supporting hole 44e and the supporting hole 44f are positioned on an axial line extending in parallel with the X1-X2 axis. A pair of short supporting shafts 45 and 45 are fixed to the insides of the both side panels of the housing 1, the supporting holes 44e and 44f are supported by the supporting shafts 45 and 45 respectively, and the roller bracket 44 is supported so as to be rotatably about the supporting shafts 45 and 45 as rotational pivots. As shown in FIG. 3, a tension coil spring 46 is hooked between the roller bracket 44 and the bottom panel 2 of the housing 1, and the roller bracket 44 is constantly urged counterclockwise.

As shown in FIG. 2, a holding hole 44g is formed at an end portion of the right side supporting portion 44a of the roller bracket 44 on the Y2 side, and a holding hole 44g (not shown) is also formed at an end portion of the left side supporting portion 44c on the Y2 side. The both end portions of the roller shaft 42 are inserted into the holding holes 44g respectively. In the waiting state shown in FIG. 2, the roller bracket 44 is urged counterclockwise by a resilient force of the tension coil spring 46, and the roller shaft 42 pressed against the fixed guiding portion 43 by its urging force.

A pinion gear is fixed to an end portion of the roller shaft 42 on the X2 side, and a rotational power from a conveying motor, not shown, is transmitted to the pinion gear, whereby the roller shaft 42 is rotated.

As shown in FIGS. 2 and 3, an opposed guiding portion 44h which connects the upper edge of the right side supporting portion 44a and the upper edge of the left side supporting portion 44c is provided on the roller bracket 44. In other words, the right side supporting portion 44a is formed by being bent downward at a right angle on the X1 side of the opposed guiding portion 44h, and the left side supporting portion 44c is formed by being bent downward at a right angle on the X2 side of the opposed guiding portion 44h.

A guide surface 44i on the upper surface of the opposed guiding portion 44h is a flat surface. In the waiting state shown in FIGS. 2 and 3, the guide surface 44i is inclined upward (Z1 direction) as it goes rearward (Y2 direction).

A movable guide portion 50 is provided between the conveying mechanism 40 and the insertion port 5. The movable guide portion 50 is formed of synthetic rein material having the same small coefficient of friction as the fixed guiding portion 43, and the lower surface thereof is a flat guide surface 51. The guide surface 51 opposes the guide surface 44i of the opposed guiding portion 44h formed on the roller bracket from above.

As shown in FIGS. 1 and 2, short supporting shafts 52 and 52 projecting in the X1 direction and the X2 direction are formed integrally on the distal portion (Y1 side) of the movable guide portion 50. The supporting shafts 52 and 52 respectively are rotatably supported by bearing portions provided on the both side panels of the housing 1. The movable guide portion 50 is urged to rotate clockwise about the supporting shafts 52 and 52 by its own weight and an urging force of a spring member, not shown. A stopper portion 53 is formed on the upper surface of the movable guide portion 50 on the Y1 side with respect to the supporting shafts 52 and 52. As shown in FIG. 3, the movable guide portion 50 serves as a limit of rotation which prevents the stopper portion 53 coming into abutment with the lower surface of the ceiling panel 3 of the housing 1 from rotating further clockwise. The movable guide portion 50 assumes an abutment position when it is inclined as shown in FIG. 3, so that the disc D inserted from the insertion port 5 easily comes into abutment with the guide surface 51.

As shown in FIG. 3, in the waiting state for waiting for the insertion of the disk, the opposed distance between the guide surface 51 on the lower surface of the movable guide portion 50 and the guide surface 44i of the opposed guiding portion 44h is wide on the side of the insertion port 5, and is gradually narrowed toward the conveying roller 41. Then, an end portion 51a of the guide surface 51 of the movable guide portion 50 on the Y2 side opposes the left side of the conveying roller 41 and, likewise, an end portion 44j of the guide surface 44i of the opposed guiding portion 44h on the Y2 side opposes the left side of the conveying roller 41. Then, the distance between the end portion 51a and the end portion 44j is narrower than the thickness of the disc D.

As shown in FIGS. 1 and 3, a mechanical switch S is fixed to a front end (end portion on the Y1 side) of the fixed guiding portion 43 at a substantially center portion in terms of the X1-X2 direction, and an actuator Sa of the switch S projects in the Y1 direction. The upper surface of the end portion of the movable guide portion 50 on the Y2 side is formed with a recess 54. When the movable guide portion 50 is rotated counterclockwise against the urging force of the spring member, the actuator Sa is pressed upward by the bottom surface of the recess 54, and the output of the switch S is switched from OFF to ON.

As shown in FIGS. 1 and 2, lifting projections 55 and 55 projecting in the X1 direction and the X2 direction are formed integrally with the rear end portion (end portion on the Y2 side) of the movable guide portion 50.

A shutter member 60 which serves as an opening and closing member is provided under the movable guide portion 50. The shutter member 60 is formed of a metallic panel. As shown in FIGS. 3 to 7, the shutter member 60 includes an opening and closing panel portion 61 which is capable of closing the insertion port 5 from the inside. The opening and closing panel portion 61 is formed into a substantially cylindrical curved portion facing its projecting side toward the insertion port 5 when it is cut along a plane parallel to the Y-Z plane.

A bent strip 61a is formed on the opening and closing panel portion 61 as the curved portion at an edge portion in the counterclockwise direction. The bent strip 61a is formed by being bent in the direction opposite from the side where connecting shafts 63 and 63 are formed at the edge of the opening and closing panel portion 61, and is an elongated inclined portion extending flatly in the X direction.

As shown in FIG. 1, the shutter member 60 includes a right side supporting portion 62a bent substantially at a right angle from the X1 side of the opening and closing panel portion 61 and a left side supporting portion 62b bent substantially at a right angle from the X2 side of the opening and closing panel portion 61.

The short connecting shafts 63 and 63 are fixed to the inner surface of the right side distal portion 44b and the inner surface of the left side distal portion 44d of the roller bracket 44, and the right side supporting portion 62a and the left side supporting portion 62b of the shutter member 60 are rotatably supported inside the roller bracket 44 with the connecting shafts 63 and 63 as the connecting pivots.

The connecting shafts 63 and 63 as the connecting pivots and the supporting shafts 45 and 45 as the rotational pivots of the roller bracket 44 are arranged at different positions and, as shown in FIG. 3, the connecting shafts 63 and 63 are arranged inwardly of the housing 1 apart from the insertion port 5 than the supporting shafts 45 and 45 when the conveyance driving mechanism 60 is apart from the insertion port 5 and hence the insertion port 6 is opened.

A spring member such as a torsion spring or a tension coil spring (both are not shown) is provided between the shutter member 60 and the roller bracket 44, and the shutter member 60 is constantly urged to rotate counterclockwise, that is, in the direction in which the opening and closing panel portion 61 is moved away from the insertion port 5 and opens the insertion port 5 in the roller bracket 44.

A projection 64 projecting in the X1 direction is provided on the right side supporting portion 62a of the shutter member 60, and a projection 64 projecting in the X2 direction is provided on the left side supporting portion 62b. When the projection 64 is pressed in the Y1 direction, the shutter member 60 is rotated clockwise against the urging force of the spring member and assumes a closing position in which the opening and closing panel portion 61 closes the insertion port 5 as shown in FIG. 7.

As shown in FIG. 1, a roller control cam portion 34 is provided on the Y1 side of the right side slider 30a. The roller control cam portion 34 includes an upper side guide portion 34a formed on the upper side, a lower side constraining portion 34b formed on the Y2 side and on the lower side thereof, and an inclined guide hole 34c continuing to the upper side guide portion 34a and the lower side constraining portion 34b. An end portion 42a of the roller shaft 42 on the X1 side is slidably inserted into the roller control cam portion 34.

A guide control cam portion 35 is formed at an end portion of the right side slider 30a on the Y1 side. The guide control cam portion 35 includes a lifting guide portion 35a on the Y1 side and a held-state guiding portion 35b extending toward the Y2 side. The lifting guide portion 35a is an inclined surface extending upward gradually toward the rear (Y2 direction), and the held-state guiding portion 35b is a horizontal plane extending in the Y1-Y2 direction. When the right side slider 30a moves in the Y1 direction, the lifting projection 55 provided on the movable guide portion 50 slides on the guide control cam portion 35, so that the position of the movable guide portion 50 is controlled.

A shutter pressing portion 37 extending upward with the intermediary of a notch 36 is formed integrally at an end portion of the right side slider 30a on the Y1 side. When the right side slider 30a moves in the Y1 direction, the projection 64 of the shutter member 60 is pressed in the Y1 direction by the shutter pressing portion 37.

The right side slider 30a is formed of synthetic resin material, and the shutter pressing portion 37 is a resiliently deformable portion. However, the shutter pressing portion 37 may be configured by attaching a resilient member such as rubber or a spring at an end portion on the Y1 side of the right side slider 30a.

Subsequently, an action to convey the disc D into the interior of the disc apparatus will be described. (Disk Insertion Waiting State)

As shown in FIGS. 1 to 3, in the disk insertion waiting state before the disc D is inserted, both the right side slider 30a and the left side slider 30b are moved in the Y2 direction. Therefore, the lifting shaft 18 is lifted by the elongated cam hole 32a of the clamp control cam portion 32 provided on the right side slider 30a, and the cramp base 12 is rotated clockwise, so that the damper 27 is moved upward away from the turn table 23.

The end portion 42a of the roller shaft 42 is guided by the upper side guide portion 34a of the roller control cam portion 34 formed on the right side slider 30a. Therefore, the roller bracket 44 is rotated counterclockwise by the resilient force applied from the tension coil spring 46 to the roller bracket 44, and the roller shaft 42 of the conveying roller 41 is urged toward the fixed guiding portion 43 by the resilient force applied from the tension coil spring 46. Also, the lifting guide portion 35a at the end portion of the right side slider 30a on the Y1 side is apart from the lifting projection 55, and the movable guide portion 50 is rotated clockwise by its own weight and the urging force of the spring member, not shown, and hence assumes an inclined abutment position as shown in FIG. 3.

As shown in FIG. 3, the shutter member 60 supported by the roller bracket 44 is rotated counterclockwise by the urging force of the spring member, not shown. Therefore, the opening and closing panel portion 61 is apart from the insertion port 5 and hence the insertion port 5 is in the opened state.

In the waiting state shown in FIG. 3, the vertical distance between the guide surface 51 on the lower surface of the movable guide portion 50 and the guide surface 44i of the opposed guiding portion 44h positioned below is wide on the side of the insertion port 5, and is gradually narrowed toward the conveying roller 41.

Since the shutter member 60 is rotated counterclockwise, the opening and closing panel portion 61 is positioned between the inner surface of a wall portion 1b bellow the insertion port 5 and the guide surface 44i of the roller bracket 44. In other words, the opening and closing panel portion 61 serves as a bridge between the wall portion 1b and the guide surface 44i, so that formation of a space which is depressed deeply downward between the inner surface of the wall portion 1b and the guide surface 44i is prevented. Therefore, the disc D inserted from the insertion port 5 is guided to the conveying roller 41 by guiding with the inner peripheral surface of the opening and closing panel portion 61 and the guide surface 44i. Although the bent strip 61a is formed at the end portion of the opening and closing panel portion 61, which is a curved portion, on the Y2 side, the bent strip 61a covers the boundary between the opening and closing panel portion 61 and the guide surface 44i in the state shown in FIG. 3, so that the disc D is smoothly guided in the Y2 direction over this boundary.

In the waiting state shown in FIG. 3, a power is not distributed to the conveying motor, and a sensing voltage is applied to the switch S. However, since a contact point of the switch S is not in contact and is opened, a current does not flow to the switch S, and the power consumption is low.

(Disk Conveying Action)

In the waiting state shown in FIG. 3, when the disc D is inserted from the insertion port 5 in the Y2 direction, the peripheral edge portion of the disc D directed toward the Y2 side is guided between the guide surface 51 of the movable guide portion 50 and the inner surface of the opening and closing panel portion 61 and the guide surface 44i of the opposed guiding portion 44h located below and opposed thereto, and reaches the conveying roller 41. In the waiting state shown in FIG. 3, the distance between the guide surface 51 of the movable guide portion 50 and the guide surface 44i of the opposed guiding portion 44h is gradually narrowed as it goes toward the Y2 side and, in addition, the end portion 51a of the guide surface 51 on the Y2 side and the end portion 44j of the guide surface 44i on the Y2 side are opposed to the side of the conveying roller 41.

In order to do so, as shown in FIG. 4, when the disc D is inserted to a position where the peripheral edge portion of the disc D directed toward the Y2 side comes into abutment with the conveying roller 41, that is, a position where a conveying force can be provided from the conveying mechanism 40, the disc D enters a clearance between the end portion 51a and the end portion 44j, and the movable guide portion 50 is lifted upward by the upper surface of the disc D. Then, the actuator Sa is lifted by the bottom portion of the recess 54 of the movable guide portion 50, and the output from the switch S is changed from OFF to ON.

A control unit, not shown, activates the conveying motor when the switch S is turned ON. The power of the conveying motor is decelerated by a reduction gear, and is transmitted to the roller shaft 42, so that the roller shaft 42 and the conveying roller 41 start to rotate clockwise, which is the conveying direction in FIG. 4. The peripheral edge of the disc D on the Y2 side is guided to a clearance between the conveying roller 41 and the fixed guiding portion 43 by a rotational force of the conveying roller 41. Since the resilient force of the tension coil spring 46 is applied to the roller shaft 42, the disc D is clamped between the conveying roller 41 and the guide surface 43a of the fixed guiding portion 43, and is conveyed inwardly of the housing 1 by the rotational force of the conveying roller 41.

Then the center hole of the conveyed disc D reaches on the turn table 23, it is sensed by the load sensing mechanism provided in the interior of the housing 1. The control unit starts the motor M shown in FIG. 1 when the load sensing mechanism is brought into a sensing state.

If the motor M is started, the right side slider 30a and the left side slider 30b are synchronously moved from the state shown in FIG. 1 in the Y1 direction. In this course, the lifting shaft 18 is guided downward by the elongated cam hole 32a of the clamp control cam portion 32 provided on the right side slider 30a, and is moved to the release hole portion 32b. Therefore, the cramp base 12 is rotated counterclockwise by the urging force of the torsion coil spring 17 about the connecting shafts 13 and 13 as pivots, and the damper 27 is moved downward toward the turn table 23.

As shown in FIG. 5, the end portion 42a of the roller shaft 42 is guided from the upper side guide portion 34a of the roller control cam portion 34 to the inclined guide hole 34c simultaneously with the counterclockwise rotating action of the cramp base 12. Therefore, the roller bracket 44 is rotated clockwise about the supporting shafts 45 and 45 against the resilient force from the tension coil spring 46. As shown in FIGS. 5 and 6, the roller bracket 44 is rotated clockwise, the disc D is moved downward together with the conveying roller 41 when the conveying roller 41 is moved downward, so that the center hole of the disc D is clamped between the turn table 23 and the damper 27 by a lowering force of the damper 27.

Since the shutter member 60 is urged counterclockwise by the spring member, not shown, and is held by the roller bracket 44, the shutter member 60 is rotated clockwise in association with the rotation of the roller bracket 44 while the roller bracket 44 is rotated clockwise as shown in FIGS. 5 to 6. At a timing when the roller bracket 44 and the shutter member 60 are rotated clockwise and the opening and closing panel portion 61 of the shutter member 60 approaches the insertion port 5 or a part of the insertion port 5 is closed by the opening and closing panel portion 61, the projection 64 is started to be pressed in the Y1 direction by the shutter pressing portion 37 provided at the Y1 side end portion of the right side slider 30a moving further in the Y1 direction. The shutter member 60 is rotated clockwise about the connecting shafts 63 and 63 as the pivots independently from the roller bracket 44 by a movement force of the right side slider 30a in the Y1 direction thereafter, and the insertion port 5 is closed by the opening and closing panel portion 61.

The relation between the rotating action of the roller bracket 44 and the rotating action of the shutter member 60 may be such that the projection 64 is pressed by the shutter pressing portion 37 of the right side slider 30a after the roller bracket 44 is rotated completely to the position shown in FIG. 6, so that the shutter member 60 is rotated clockwise, or such that the projection 64 is started to be pressed by the shutter pressing portion 37 of the right side slider 30a in the course from the starting of clockwise rotation of the roller bracket 44 from the position in FIG. 3 until reaching an end portion shown in FIG. 6, and the shutter member 60 starts to rotate clockwise in the course of clockwise rotation of the roller bracket 44.

In any event, only by the rotation of the roller bracket 44 from the position in FIG. 3 to the position in FIG. 6, the opening and closing panel portion 61 of the shutter member 60 can only approach the insertion port 5, or can be rotated only to the position which closes only part of the insertion port 5. Then, the shutter member 60 is rotated to the position in which the opening and closing panel portion 61 can completely close the insertion port 5 as shown in FIG. 7 only when the projection 64 is pressed by the shutter pressing portion 37 of the right side slider 30a.

Since the shutter pressing portion 37 is able to be deformed resiliently, even when a finger or any foreign substance is inserted from the insertion port 5 and an upper edge portion 61b of the opening and closing panel portion 61 comes into contact with the finger or the foreign substance while the shutter member 60 is rotated in the closing direction, the pressing force applied to the finger or the foreign substance from the opening and closing panel portion 61 is alleviated.

As shown in FIG. 7, since the shutter member 60 is resiliently pressed clockwise by the resiliently deformable shutter pressing portion 37 when the insertion port 5 is closed by the opening and closing panel portion 61 of the shutter member 60, the bent strip 61a of the shutter member 60 is pressed against the inner surface of the wall portion 1b of the housing 1 below the insertion port 5, so that the bent strip 61a is able to prevent generation of a clearance below the insertion port 5. The upper edge portion 61b of the opening and closing panel portion 61 enters inwardly of the wall portion 1b of the housing 1 above the insertion port 5, so that the insertion port 5 is completely closed.

When the right side slider 30a is moved in the Y1 direction, the lifting projection 55 is lifted by the lifting guide portion 35a of the guide control cam portion 35, and is then held by the held-state guiding portion 35b. Consequently, as shown in FIGS. 6 and 7, the movable guide portion 50 is rotated counterclockwise and the guide surface 51 on the lower surface of the movable guide portion 50 assumes a horizontal position, so that the clamped disc D is moved upward away.

In the state shown in FIG. 7, the disc D is rotated together with the turn table 23 by the rotational force of the spindle motor 21. At this time, as shown in FIG. 7, the peripheral edge portion of the rotating disc faces the opening and closing panel portion 61 of the shutter member 60. However, since the opening and closing panel portion 61 is a curved portion which faces its projecting side in the Y1 direction, a distance is secured between the outer peripheral edge of the disc D and the inner surface of the opening and closing panel portion 61. Therefore, even when the mechanism unit 10 supported by the dampers 15a and 15b is moved in the Y1 direction to some extent while the disc D is rotating, the outer peripheral edge of the disc D does not come into abutment with the inner surface of the opening and closing panel portion 61.

Also, as shown in FIG. 7, since the opening and closing panel portion 61 as the curved portion projects in the Y1 direction in the interior of the insertion port 5 when the insertion port 5 is closed by the shutter member 60 (projects in the Y1 direction with respect to the inner surface of the front panel 4), a configuration in which the outer peripheral edge of the disc D is prevented from coming into abutment with the inner surface of the opening and closing panel portion 61 even though the distance between the insertion port 5 and the turn table 23 is reduced as short as possible is achieved.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disc apparatus comprising:
    a housing having an insertion port through which a disk is inserted;
    a supporting member configured to support a conveying member provided inside the insertion port and move the conveying member between a disc conveying position and a retracted position apart from the disk;
    an opening and closing member supported by the supporting member and movable relative to the insertion port; and
    a change-over member configured to provide a moving force to the opening and closing member,
    wherein when the supporting member moves the conveying member from the disk conveying position to the retracted position, the opening and closing member is moved to a position near the insertion port or a position to close part of the insertion port in association with the movement of the supporting member, and then, the opening and closing member is moved by the change-over member to a position to close the insertion port.

2. The disc apparatus according to claim 1, wherein the supporting member is rotatably supported in the housing, a rotational pivot of the supporting member is provided on a side of the insertion port with respect to the conveying member, and the opening and closing member is movably supported by the supporting member on the side of the insertion port with respect to the conveying member.

3. The disc apparatus according to claim 2, wherein the opening and closing member is rotatably supported by the supporting member by a connecting pivot, the connecting pivot being at a position different from the rotational pivot of the supporting member.

4. The disc apparatus according to claim 2, wherein the opening and closing member is formed of a panel member and includes a curved portion projecting outwardly of the insertion port.

5. The disc apparatus according to claim 4, wherein the curved portion enters an interior of the insertion port when the opening and closing member closes the insertion port.

6. The disc apparatus according to claim 4, wherein the opening and closing member includes a bent strip formed by bending an edge portion of the curved portion toward an opposite side from a side where the connecting pivot exists, and the bent strip opposes an inside of the edge portion of the insertion port when the opening and closing member closes the insertion port.

7. The disc apparatus according to claim 1, wherein an inner surface of the opening and closing member extends from the insertion port inwardly of the housing and serves as a guide surface for the disc inserted from the insertion port when the opening and closing member is in an opened position apart from the insertion port.

8. The disc apparatus according to claim 1, wherein the change-over member moves the supporting member by a moving force in one direction to move the conveying member from the disk conveying position to the retracted position, and then moves further in the one direction to move the opening and closing member to the position to close the insertion port.

9. The disc apparatus according to claim 1, wherein the moving force of the change-over member is transmitted to the opening and closing member via a resilient member.

10. The disc apparatus according to claim 9, wherein the resilient member is a resiliently deformable portion integral with the change-over member.

11. The disc apparatus according to claim 1, comprising a spring member provided between the opening and closing member and the supporting member, wherein the spring member urges the opening and closing member in the direction to open the insertion port.

12. A disc apparatus comprising:
a housing having an insertion port through which a disk is inserted;
an opening and closing member supported within the housing and movable relative to the insertion port;
a conveying member provided inside the insertion port for conveying the disk, the conveying member moveable between a conveying position and a retracted position; and
a change-over member configured to provide a moving force to the opening and closing member,
wherein when the conveying member is moved from the disk conveying position to the retracted position, the opening and closing member is moved to a position near the insertion port or a position to close part of the insertion port, and then, the opening and closing member is moved by the change-over member to a position to close the insertion port.

* * * * *